United States Patent [19]

Marschall et al.

[11] Patent Number: 4,932,365
[45] Date of Patent: Jun. 12, 1990

[54] SYSTEM FOR EVAPORATION COOLING OF AN INTERNAL COMBUSTION ENGINE AND FOR OPERATION OF A HEATING HEAT EXCHANGER BY THE COOLANT

[75] Inventors: Hans Marschall, Wolfsburg; Herbert Schäpertöns, Gifhorn; Bodo Scheibner, Wolfsburg, all of Fed. Rep. of Germany

[73] Assignee: Volkswagen AG, Wolfsburg, Fed. Rep. of Germany

[21] Appl. No.: 172,147

[22] Filed: Mar. 23, 1988

[30] Foreign Application Priority Data

Apr. 2, 1987 [DE] Fed. Rep. of Germany ....... 3711112

[51] Int. Cl.⁵ .............................. F02P 7/02; F02P 9/02
[52] U.S. Cl. ................................ 123/41.05; 123/41.21
[58] Field of Search ................ 123/41.2, 41.21, 41.23, 123/41.05

[56] References Cited

U.S. PATENT DOCUMENTS

| | | | |
|---|---|---|---|
| 2,351,203 | 6/1944 | Hanson | 123/41.05 |
| 2,413,770 | 1/1947 | Knoy | 123/41.21 |
| 4,367,699 | 1/1983 | Evans | 123/41.21 X |
| 4,475,485 | 10/1984 | Sakakibara et al. | 123/41.05 |
| 4,539,943 | 9/1985 | Tsuchikawa et al. | 123/41.05 |
| 4,605,163 | 8/1986 | Hayashi | 123/41.21 X |
| 4,605,164 | 8/1986 | Hayashi et al. | 123/41.21 X |
| 4,664,073 | 5/1987 | Hirano | 123/41.21 |
| 4,667,626 | 5/1987 | Hayashi et al. | 123/41.21 |
| 4,694,784 | 9/1987 | Hirano et al. | 123/41.21 X |
| 4,721,071 | 1/1988 | Fujigaya et al. | 123/41.21 |
| 4,766,852 | 8/1988 | Hirano et al. | 123/41.21 |

Primary Examiner—Craig R. Feinberg
Attorney, Agent, or Firm—Brumbaugh, Graves, Donohue & Raymond

[57] ABSTRACT

In the typical cooling system described in the specification, an internal combustion engine has coolant conduits connected to a coolant circuit for cooling the engine and to a heater circuit for heating the vehicle. The coolant circuit includes a valve to close the circuit during warming-up of the engine to permit fast warming-up of the vehicle and at high engine temperature conditions the coolant may be circulated through the heater circuit to provide additional heat removal from the coolant.

12 Claims, 1 Drawing Sheet

SYSTEM FOR EVAPORATION COOLING OF AN INTERNAL COMBUSTION ENGINE AND FOR OPERATION OF A HEATING HEAT EXCHANGER BY THE COOLANT

BACKGROUND OF THE INVENTION

This invention relates to systems for evaporation cooling of internal combustion engines and operation of a heater by the coolant and, more particularly, to a new and improved system of this type. The principle of evaporation cooling of internal combustion engines, which is known in various embodiments described in the patent literature, offers the advantage of considerably greater efficiency than conventional liquid or convection cooling in that the heat transfer is determined by the heat of evaporation and, correspondingly, the heat of condensation.

Heating systems for vehicles usually utilize the waste heat of the internal combustion engine, which is carried away from the engine by the cooling water. In a typical vehicle heating system, the cooling water passes through one or more heat exchangers from which heat is removed by means of an air current generated by a fan. In some cases the internal combustion engine is cooled by evaporation cooling and the heat of the coolant is utilized to operate the vehicle heating system. For example, Published European Application No. 0 189 881 and German Offenlegungsschrift No. 36 03 897 describe cooling systems operating according to the evaporation principle, wherein the coolant circulation chambers and conduits of the internal combustion engine are connected to a heating circuit containing a pump and a heat exchanger for heating the passenger compartment. The connection of this heating circuit, however, is arranged so that only coolant in the liquid state flows through the heat exchanger. Consequently the principal advantage of evaporation cooling, namely, the increased heat transfer due to the two-fold change of the physical condition of the coolant, is not utilized in the heating system. On the other hand, the conventional systems offer the advantage that, because the liquid coolant is supplied to the heating system from a location close to the point of heat generation, i.e., at the combustion chambers of the engine, heat for heating the automobile is available very soon after the engine has been started.

A further advantage of the conventional systems results from the fact that the heating circuit carries only a relatively small quantity of the cooling medium so that the removal of heat from the medium in the automobile heater delays the warming-up of the internal combustion engine to operating temperature only to a limited extent. In the conventional systems, the main coolant condenser becomes operative as soon as the engine temperature is high enough to produce evaporation of the cooling medium in the coolant conduits within the engine.

U.S. Pat. No. 4,367,699 also describes an internal combustion engine cooling system operating according to the evaporation principle in which the heat exchanger for the automobile heater is connected to a tank for separating vaporized and liquid coolant so that the heat exchanger for the heater receives coolant only in vapor form and is permanently connected in series with the main coolant condenser of the cooling system. In addition, the system described in that patent contains an especially "small" cooling circuit with a circulating pump which assures uniform warming-up of the internal combustion engine after it is started. When the coolant temperature is close to the boiling temperature, the "small" cooling circuit is interrupted by disconnection of the pump, and the evaporation cooling of the engine started.

Therefore, with respect to the operation of the heating heat exchanger itself, the arrangement described in U.S. Pat. No. 4,367,699 suffers from the fundamental disadvantage that the heating heat exchanger only receives coolant a relatively long time after the engine is started, i.e., after evaporation cooling has commenced. However, it is known that a fundamental necessity for the operation of automobiles is defogging the windshield and side windows by directing a heated air flow toward them immediately after the engine has been started, i.e, before driving has begun, and keeping them fog free. This basic requirement cannot be satisfied by the system described in U.S. Pat. No. 4,367,699.

SUMMARY OF THE INVENTION

Accordingly, it is an object of the present invention to provide a system for evaporation cooling of internal combustion engines and for operating a vehicle heater which overcomes the above-mentioned disadvantages of the prior art.

Another object of the invention is to provide a new and improved evaporation cooling system which assures prompt heating of the vehicle.

These and other objects of the invention are attained by providing an evaporation cooling system for an internal combustion engine having a main condenser and a heater condenser with a valve arrangement for circulating coolant only through the heater condenser and condensing vaporized coolant therein during warm-up of the engine.

On the one hand, this arrangement provides the advantages of good heat transfer resulting from the change in the physical state of the coolant in the condenser operating as a heating heat exchanger which may be arranged to heat air directed toward the vehicle windows and, on the other hand, it ensures a rapid heating up of the heat exchanger after the engine has been started.

In addition, the main cooling condenser for the evaporation cooling system may be provided with a shutter for controlling the flow of cool air past the condenser in accordance with operating parameters of the engine, such as the load condition, or a parameter of the coolant, such as its temperature. While such control arrangements are especially advantageous when used with a combined evaporation cooling and vehicle heating system as described above, they are also advantageous even if the use of the coolant for vehicle heating is dispensed with.

In addition to the simple and convenient arrangement of the invention, a special advantage is obtained because the main condenser is disconnected during the warming-up phase of the internal combustion engine, leaving only the small heat exchanger condenser in the vehicle heater to remove heat from the coolant so that the engine heats up more rapidly.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
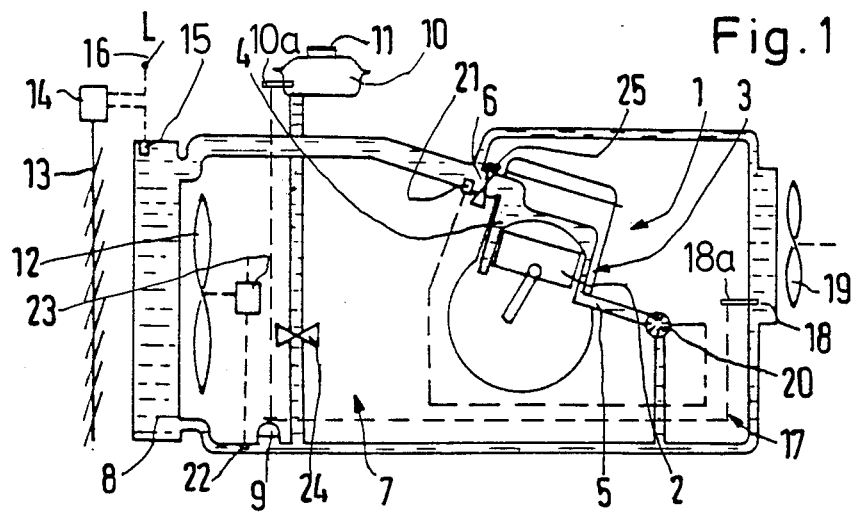
FIG. 1 is a schematic side view, partly in section, showing a representative evaporation cooling system for an internal combustion engine arranged in accordance with the invention, showing the engine in a cold state.

In the typical cooling system shown in FIG. 1, an internal combustion engine 1 has a piston 2 mounted for reciprocation in a cylinder 3. The cylinder contains coolant-filled conduits 4 surrounding the piston which are connected to a coolant inlet 5 and a coolant outlet 6 so as to cause coolant to flow through the conduits 4.

A coolant circuit 7 includes the conduits 4, the inlet 5 and the outlet 6 and also a main condenser 8, a valve 9, which is actuated by the coolant pressure, and a coolant reservoir 10. A pressure relief valve 11 normally seals the reservoir 10 from the atmosphere so that the reservoir is a pressure-equalizing reservoir.

An electrically operated fan 12 is positioned behind the main condenser 8 and a controllable shutter 13 is located in front of the main condenser. The shutter 13 is actuated, in a manner to be described below, by a trigger circuit 14 in accordance with the temperature of the coolant as detected by a temperature sensor 15 in the main condenser 8 and with the engine load condition as detected by a throttle valve switch 16.

Another coolant circuit 17 also includes the conduits 4 in the engine 1 as well as the inlet 5 and outlet 6 and contains a heat exchanger 18, which may also be designated as secondary condenser, for the vehicle heater. Associated with the heat exchanger 18 are a heater fan 19 and a coolant pump 20 which may be turned on by the vehicle operator when heat is desired so that the heated coolant will be pumped through the condenser 18. In addition, the pump 20 may also be turned on automatically when a predetermined high coolant temperature is detected by a temperature sensor 21 of the coolant outlet from the engine so that the heating circuit 17 becomes effective as small cooling circuit for the coolant at least when the coolant is at its vaporization temperature.

Considering initially the conditions when the internal combustion engine 1 is cold, the reservoir 10 contains at most a small amount of coolant and the coolant is in liquid form throughout the entire system as shown in FIG. 1. In contrast to the reservoir 10, the cooling and heating system itself is filled with liquid coolant and vented. The valve 9, which is actuable by the coolant pressure, is in the closed position so that the main condenser 8 is disconnected from the cooling circuit 7 and from the heating circuit 17.

If there is a demand for heat in the vehicle interior after the engine has been started, the coolant pump 20 is turned on so that a coolant flow is produced in the heating circuit 17 in the clockwise direction as seen in FIG. 1, i.e., increasingly warm coolant is transported through the heating heat exchanger 18. The operation of the coolant pump 20 may also be dependent on the attainment of a defined minimum temperature of the coolant which is detected by a temperature sensor 21. Thus, during the summer when no heating is required, operation of the coolant pump 20 is produced by the temperature sensor 21 and a gating circuit, not shown, whenever the temperature of the coolant has attained a selected high value below the boiling temperature thereof. As a result, operation of the coolant pump 20 is initiated independently from the heating operation during warming-up of the internal combustion engine 1.

Obviously it is possible to provide a regulated or controlled coolant pump 20, which delivers coolant at a rate that may be changed as a function of parameters of the internal combustion engine and/or the demand for heat in the vehicle.

Figure 2:
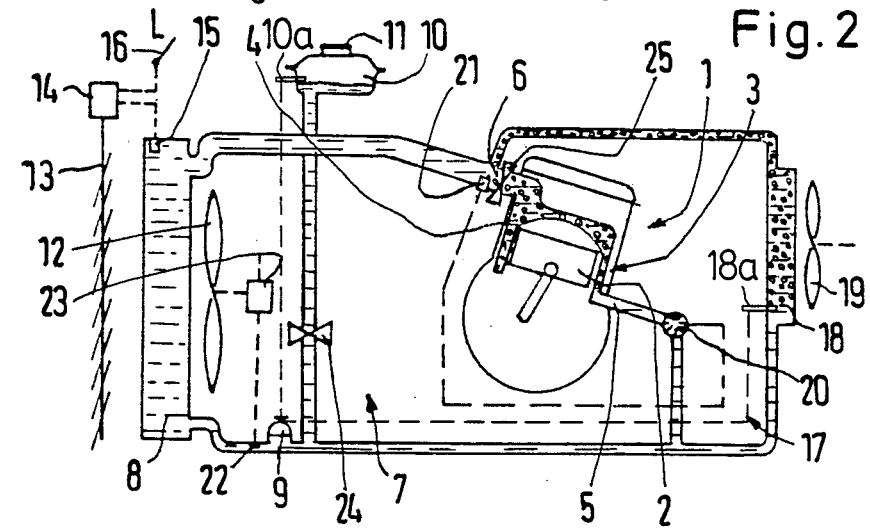
FIG. 2 is a view similar to that of FIG. 1, showing the system with the engine in a partially warmed-up state.

As the warming-up of the internal combustion engine 1 continues, the temperature of the coolant increases, at least locally, above its boiling point so that vapor bubbles are generated which are condensed at other points in the coolant circuit or reach the heat exchanger 18 which in this condition serves as secondary condenser, as shown in FIG. 2. Due to the formation of vapor bubbles and because the pressure valve 9 is still closed, liquid coolant is displaced into the reservoir 10, which serves as an equalizing reservoir, and the vaporized coolant condensed in the heat exchanger 18 gives off its condensation heat to the vehicle heating system.

Figure 3:
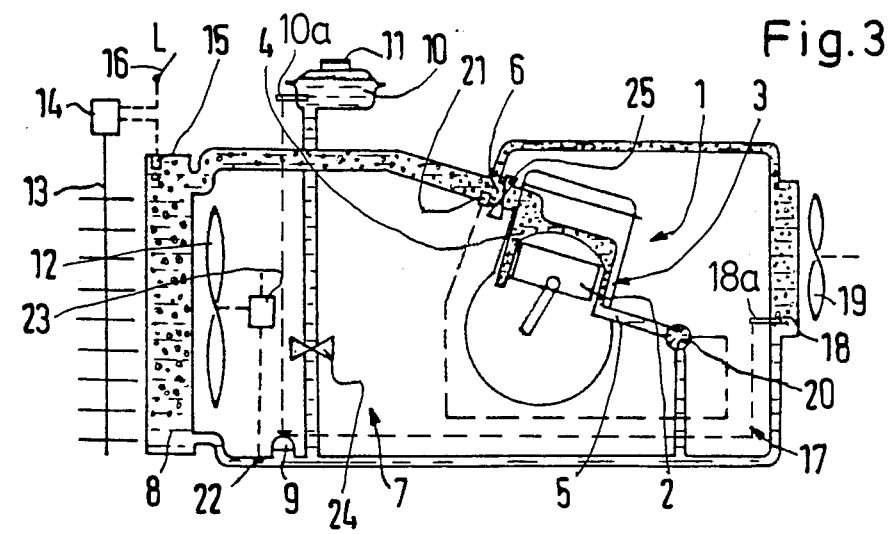
FIG. 3 is a view similar to that of FIG. 1, showing the system with the engine in the fully warmed-up state.

As the evaporation of the coolant increases, the pressure in the system, and thus at the location of the valve 9, increases so that the valve 9 opens to connect the main condenser 8 into the cooling circuit 7. As shown in FIG. 3, the evaporated coolant now passes from the outlet 6 of the engine 1 through the main condenser 8 as well as through the condenser 18 and is condensed and collects in liquid form in the bottom of both condensers.

If desired, the valve 9, instead of being controlled by the coolant pressure, may be controlled as a function of the coolant level in the reservoir 10 as detected by a sensor 10a or in the heat exchanger 18 as detected by a sensor 18a or also as a function of the temperature measured in the heat exchanger 18. With that arrangement, as soon as the temperature in the heat exchanger 18 has reached a threshold value just below the boiling temperature of the coolant, opening of the valve 9 to connect the main condenser 8 is effected.

The system is designed so that, at unfavorable conditions, i.e., maximum vapor volume, high outside temperature and low velocity of the cooling air flowing through the main condenser, the coolant vapor fills almost the entire main condenser 8.

It may be useful to optimize the coolant pressure in the system for different operating conditions of the internal combustion engine. In this way, the different boiling temperatures of the coolant at different pressure levels permits the control of different temperatures of the internal combustion engine in the region of the combustion chambers. For example, a higher engine temperature, and a correspondingly higher boiling temperature of the coolant, provides greater efficiency of the engine and favorable exhaust emissions in case of a partial engine load than at full engine load. For a full engine load, a lower boiling temperature assuring cooler combustion chamber walls provides a torque increase through increased combustion chamber filling with a simultaneous decrease in the knock tendency. Theoretically, this can be accomplished by controlling the speed of the fan 12 as a function of the actual temperature of the coolant as detected by a temperature sensor 22 and as a function of a desired temperature value which, for example, is dependent upon the load condition of the engine and is stored in a control instrument 23.

In the illustrated embodiment, the shutter 13 is provided in addition to the above-described controlled actuation of the fan 12, and the shutter is adjustable as a function of the aforementioned quantities between its substantially closed state as shown in FIGS. 1 and 2 and its fully open state as shown in FIG. 3. As a rule, opening of the shutter 13 in order to influence the coolant pressure will be effected only when the engine is warm as shown in FIG. 3, whereas during the operating phases of the engine as depicted in FIGS. 1 and 2, the shutter will be closed.

In order to prevent the air cushion above the liquid surface in the reservoir 10 from counteracting the controlled increase in coolant pressure described above, a valve 24 is provided in the line connecting the reservoir to the circuit 7 in the illustrated embodiment so that, as the generation of heat increases in the internal combustion engine 1, the increased pressure can build up as evaporation of the coolant increases in the coolant circuit 7 itself, including the heating circuit 17.

In many cases, the connecting lines of the coolant circuit are in the form of flexible hoses so that it may be necessary to confine the increase in fluid pressure to the conduits 4 in the internal combustion engine 1. In that case, a valve 25 may be provided at the outlet 6 before the junction of the coolant lines leading to the main condenser 8 and to the heat exchanger 18 and a back pressure valve (not shown) is provided at the inlet 5 to the conduits 4. During partial load operation, i.e., during operating phases in which a higher engine temperature is desirable, the valve 25 disconnects the coolant conduits 4 from the rest of the system. In that case, however, an interruption in the delivery of the heated coolant to the heater heat exchanger 18 must be accepted in the bargain.

The use of low-boiling coolants, such as methanol, is preferable since while offering equal cooling performance, they produce a smaller vapor volume and prevent undesirable vacuum in the system which would result in a contraction of the hoses and intake of air.

The invention thus provides a system which utilizes the fundamental advantages of evaporation cooling of an internal combustion engine for the operation of a heating heat exchanger.

Although the invention has been described herein with reference to specific embodiments, many modifications and variations therein will readily occur to those skilled in the art. Accordingly, all such variations and modifications are included within the intended scope of the invention.

We claim:

1. A system for evaporation cooling of an internal combustion engine by evaporation of a coolant and for operation of at least one heating heat exchanger by the coolant comprising an internal combustion engine having a plurality of conduits extending within the engine for circulation of coolant therein and communicating with an inlet and an outlet, a coolant circuit arranged between the inlet and the outlet including a main condenser, a coolant reservoir to receive liquid coolant, a heating circuit comprising at least some of the engine conduits and including the heating heat exchanger and a coolant pump, and main condenser valve means for disconnecting the main condenser from the coolant circuit to permit circulation of liquid coolant only in the heating circuit during warming-up of the engine and permitting use of the heating heat exchanger as a condenser of vaporized coolant, the coolant reservoir being connectable to the heating circuit independently of the main condenser valve means, thereby insuring complete filling of the system with liquid coolant, wherein the main condenser valve means is arranged to connect the main condenser to the coolant circuit when the temperature of the coolant within the heating heat exchanger attains a value near its boiling temperature.

2. A system according to claim 1 including means separately responsive to a function of a demand of heating energy and to occurrence of vaporized coolant in the heating circuit for controlling operation of the coolant pump.

3. A system for evaporation cooling of an internal combustion engine by evaporation of a coolant and for operation of at least one heating heat exchanger by the coolant comprising an internal combustion engine having a plurality of conduits extending within the engine for circulation of coolant therein and communicating with an inlet and an outlet, a coolant circuit arranged between the inlet and the outlet including a main condenser, a coolant reservoir to receive liquid coolant, a heating circuit comprising at least some of the engine conduits and including the heating heat exchanger and a coolant pump, and main condenser valve means located between the main condenser and a connection joining the cooling circuit and the coolant reservoir for disconnecting the main condenser from the cooling circuit while maintaining communication of the heating heat exchanger with the coolant circuit and the coolant reservoir, to cause circulation of liquid and vaporized coolant only to the heating heat exchanger during warming-up of the engine and permitting use of the heating heat exchanger as a condenser of vaporized coolant, the coolant reservoir being connectable to the heating circuit independently of the main condenser valve means, thereby insuring complete filling of the system with liquid coolant.

4. A system according to claim 3 including means separately responsive to a function of the heating energy demand and to the occurrence of vaporized coolant in the heating circuit for controlling the operation of the coolant pump.

5. A system according to claim 3 or claim 4 wherein the main condenser valve means is arranged to connect the main condenser to the coolant circuit when a selected pressure value of the coolant is attained within the heating circuit.

6. A system according to claim 3 or claim 4 wherein the main condenser valve means is arranged to connect the main condenser to the coolant circuit when the coolant level in at least one of the heating heat exchanger and the reservoir reaches a selected value.

7. A system according to claim 3 or claim 4 wherein the reservoir is permanently connected to the heating circuit.

8. A system according to claim 3 including adjustable shutter means disposed in the path of air flowing past the main condenser to control the flow of cooling air thereto, and control means for controlling position of the shutter means in accordance with engine load and coolant temperature to optimize pressure of the coolant.

9. A system according to claim 8 including reservoir valve means for isolating the cooling circuit from the reservoir in order to permit an increase in the coolant pressure.

10. A system according to claim 3 or claim 8 including coolant circuit valve means for isolating the engine conduits from the coolant circuit to permit an increase of coolant pressure in the engine conduits, and control means for controlling the coolant circuit valve means.

11. A system according to claim 10 wherein the coolant circuit valve control means is responsive to an operating parameter of the engine.

12. A system according to claim 10 wherein the coolant circuit valve control means is responsive to a parameter of coolant.

* * * * *